US009470805B2

(12) United States Patent
Forgues et al.

(10) Patent No.: US 9,470,805 B2
(45) Date of Patent: Oct. 18, 2016

(54) VOLUMETRIC AND NON-VOLUMETRIC SOURCES-BASED SEISMIC SURVEY AND METHOD

(71) Applicant: CGG SERVICES SA, Massy (FR)

(72) Inventors: Eric Forgues, Bures-sur-Yvette (FR); Francois-Xavier Gresillon, Rully (FR); Julien Cotton, Paris (FR)

(73) Assignee: CGG SERVICES SA, Massy (FR)

( * ) Notice: Subject to any disclaimer, the term of this patent is extended or adjusted under 35 U.S.C. 154(b) by 335 days.

(21) Appl. No.: 14/103,177

(22) Filed: Dec. 11, 2013

(65) Prior Publication Data
US 2014/0177386 A1     Jun. 26, 2014

Related U.S. Application Data

(60) Provisional application No. 61/740,915, filed on Dec. 21, 2012.

(51) Int. Cl.
| *G01V 1/00* | (2006.01) |
| *G01V 1/04* | (2006.01) |
| *G01V 1/053* | (2006.01) |
| *G01V 1/133* | (2006.01) |
| *G01V 1/34* | (2006.01) |

(52) U.S. Cl.
CPC .............. *G01V 1/04* (2013.01); *G01V 1/053* (2013.01); *G01V 1/133* (2013.01); *G01V 1/34* (2013.01); *G01V 2210/121* (2013.01); *G01V 2210/1299* (2013.01); *G01V 2210/20* (2013.01)

(58) Field of Classification Search
CPC ...................................................... G01V 1/135

USPC ................................................. 181/106, 119
See application file for complete search history.

(56) References Cited

U.S. PATENT DOCUMENTS

| 2,217,361 | A | * | 10/1940 | Evjen | G01V 7/00 73/382 R |
| 3,105,456 | A | * | 10/1963 | Gongwer | G01V 1/135 116/137 A |
| 3,330,375 | A | * | 7/1967 | White | G01V 1/44 367/28 |
| 3,378,096 | A | * | 4/1968 | Cherry, Jr. | G01V 1/284 367/75 |
| 3,475,722 | A | * | 10/1969 | White | G01V 1/46 181/104 |
| 3,721,311 | A | * | 3/1973 | Mott-Smith | G01V 1/135 181/120 |
| 4,042,063 | A | * | 8/1977 | Waters | G01V 1/133 181/106 |
| 4,153,134 | A | * | 5/1979 | Yang | G01V 1/135 181/115 |
| 4,207,961 | A | * | 6/1980 | Kitsunezaki | G01V 1/145 181/106 |
| 4,280,200 | A | * | 7/1981 | Silverman | G01V 1/30 166/250.1 |

(Continued)

*Primary Examiner* — Krystine Breier
(74) *Attorney, Agent, or Firm* — Patent Portfolio Builders PLLC

(57) ABSTRACT

A seismic survey system for surveying a subsurface. The system includes a volumetric land source buried underground for generating P-waves; a non-volumetric land source buried underground for generating P- and S-waves; plural receivers distributed about the volumetric and non-volumetric land sources and configured to record seismic signals corresponding to the P- and S-waves; and a controller connected to the volumetric land source and the non-volumetric land source and configured to shot them in a given pattern.

11 Claims, 12 Drawing Sheets

(56) References Cited

U.S. PATENT DOCUMENTS

| | | | | |
|---|---|---|---|---|
| 4,282,587 | A * | 8/1981 | Silverman | E21B 43/247 367/14 |
| 4,346,779 | A * | 8/1982 | Manin | G01V 1/387 181/120 |
| 4,365,322 | A * | 12/1982 | Widrow | G01V 1/42 181/106 |
| 4,383,308 | A * | 5/1983 | Caldwell | G01V 1/46 181/103 |
| 4,383,591 | A * | 5/1983 | Ogura | G01V 1/143 181/106 |
| 4,419,748 | A * | 12/1983 | Siegfried, II | G01V 1/44 181/102 |
| 4,516,206 | A * | 5/1985 | McEvilly | G01V 1/288 367/40 |
| 4,596,005 | A * | 6/1986 | Frasier | G01V 1/286 367/38 |
| 4,597,066 | A * | 6/1986 | Frasier | G01V 1/286 367/38 |
| 4,606,014 | A * | 8/1986 | Winbow | G01V 1/44 181/104 |
| 4,648,039 | A * | 3/1987 | Devaney | G01V 1/286 367/47 |
| 4,649,526 | A * | 3/1987 | Winbow | G01V 1/44 367/25 |
| 4,682,308 | A * | 7/1987 | Chung | B06B 1/085 181/106 |
| 4,698,792 | A * | 10/1987 | Kurkjian | G01V 1/44 101/104 |
| 4,703,460 | A * | 10/1987 | Kurkjian | G01V 1/44 181/104 |
| 4,774,693 | A * | 9/1988 | Winbow | G01V 1/44 367/27 |
| 4,803,666 | A * | 2/1989 | Alford | G01V 1/003 367/36 |
| 4,805,727 | A * | 2/1989 | Hardee | G01V 1/155 181/106 |
| 4,862,991 | A * | 9/1989 | Hoyle | G01V 1/145 181/106 |
| 4,903,244 | A * | 2/1990 | Alford | G01V 1/003 367/36 |
| 5,036,945 | A * | 8/1991 | Hoyle | G01V 1/52 181/102 |
| 5,047,992 | A * | 9/1991 | Howlett | B06B 1/04 181/106 |
| 5,077,697 | A * | 12/1991 | Chang | G01V 1/44 367/31 |
| 5,265,067 | A * | 11/1993 | Chang | G01V 1/46 367/31 |
| 5,687,138 | A * | 11/1997 | Kimball | G01V 1/50 367/25 |
| 6,098,021 | A * | 8/2000 | Tang | G01V 1/50 702/14 |
| 7,266,046 | B1 * | 9/2007 | Ruffa | G01V 1/135 367/171 |
| 7,835,223 | B2 * | 11/2010 | Goujon | G01V 1/364 367/16 |
| 8,040,754 | B1 * | 10/2011 | Hardage | G01V 1/284 367/37 |
| 2003/0002388 | A1 * | 1/2003 | Mandal | G01V 1/44 367/25 |
| 2004/0176911 | A1 * | 9/2004 | Bratton | G01V 1/50 702/6 |
| 2005/0222775 | A1 * | 10/2005 | Kisra | G01V 3/34 702/14 |
| 2006/0062082 | A1 * | 3/2006 | Mandal | G01V 1/44 367/25 |
| 2007/0195643 | A1 * | 8/2007 | Bakulin | G01V 1/303 367/38 |
| 2008/0247270 | A1 * | 10/2008 | Tabarovsky | G01V 1/44 367/31 |
| 2009/0323472 | A1 * | 12/2009 | Howe | G01V 1/003 367/41 |
| 2010/0020639 | A1 * | 1/2010 | Sinha | G01V 1/48 367/31 |
| 2012/0120767 | A1 * | 5/2012 | Vu | G01V 1/46 367/31 |
| 2012/0163121 | A1 * | 6/2012 | Hardage | G01V 1/286 367/21 |
| 2012/0218862 | A1 * | 8/2012 | Nakajima | G01V 1/44 367/81 |
| 2012/0243378 | A1 * | 9/2012 | Morozov | G01V 1/135 367/143 |
| 2013/0114375 | A1 * | 5/2013 | Meier | G01V 1/003 367/21 |
| 2013/0163386 | A1 * | 6/2013 | Sallas | G01V 1/047 367/189 |
| 2013/0238248 | A1 * | 9/2013 | Aeron | G01V 1/36 702/17 |
| 2015/0007984 | A1 * | 1/2015 | Donderici | E21B 47/09 166/250.01 |
| 2015/0109884 | A1 * | 4/2015 | Cotton | G01V 1/04 367/25 |

* cited by examiner

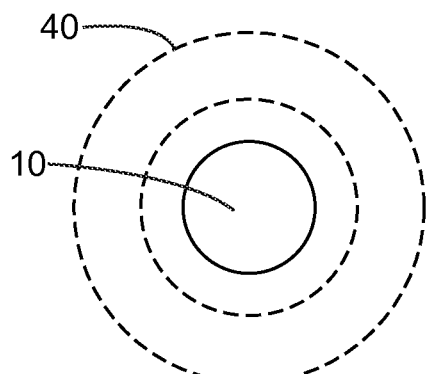
Figure 1B
Figure 1A
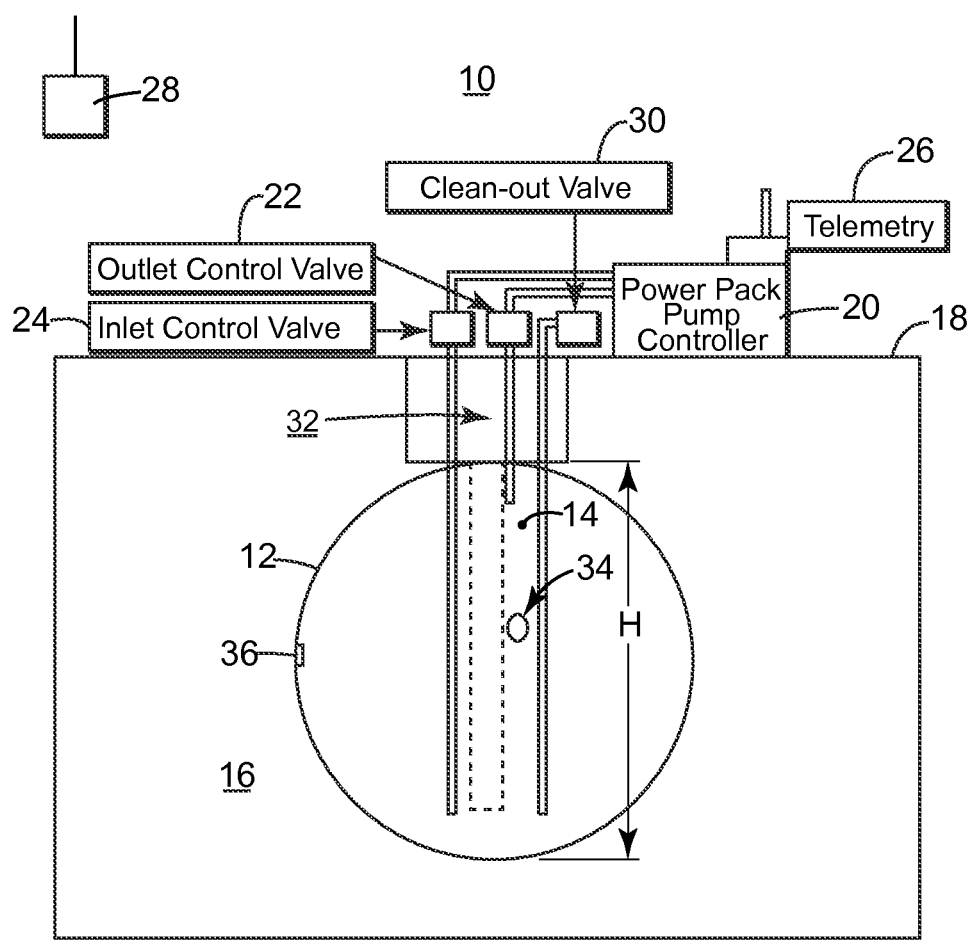

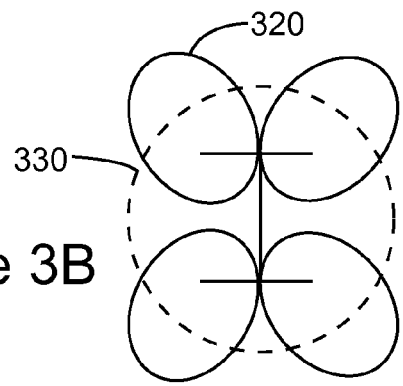
Figure 3B
Figure 3A
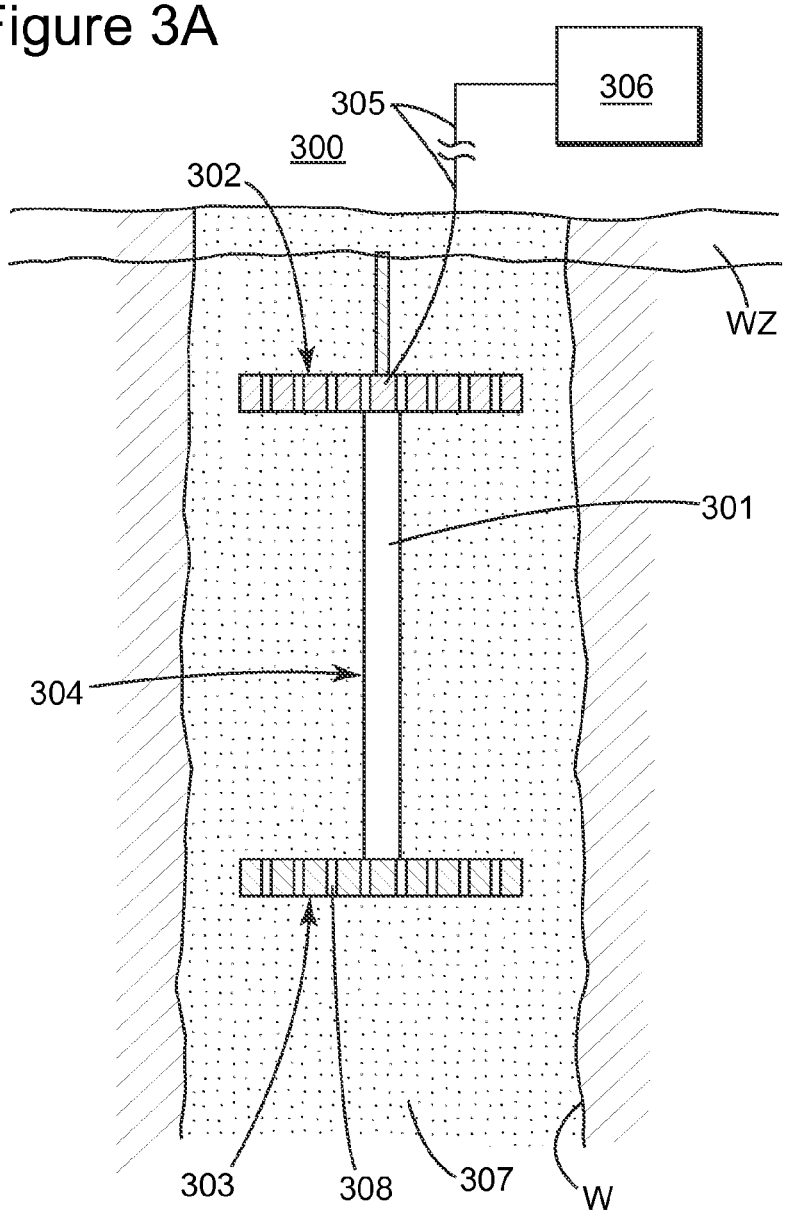

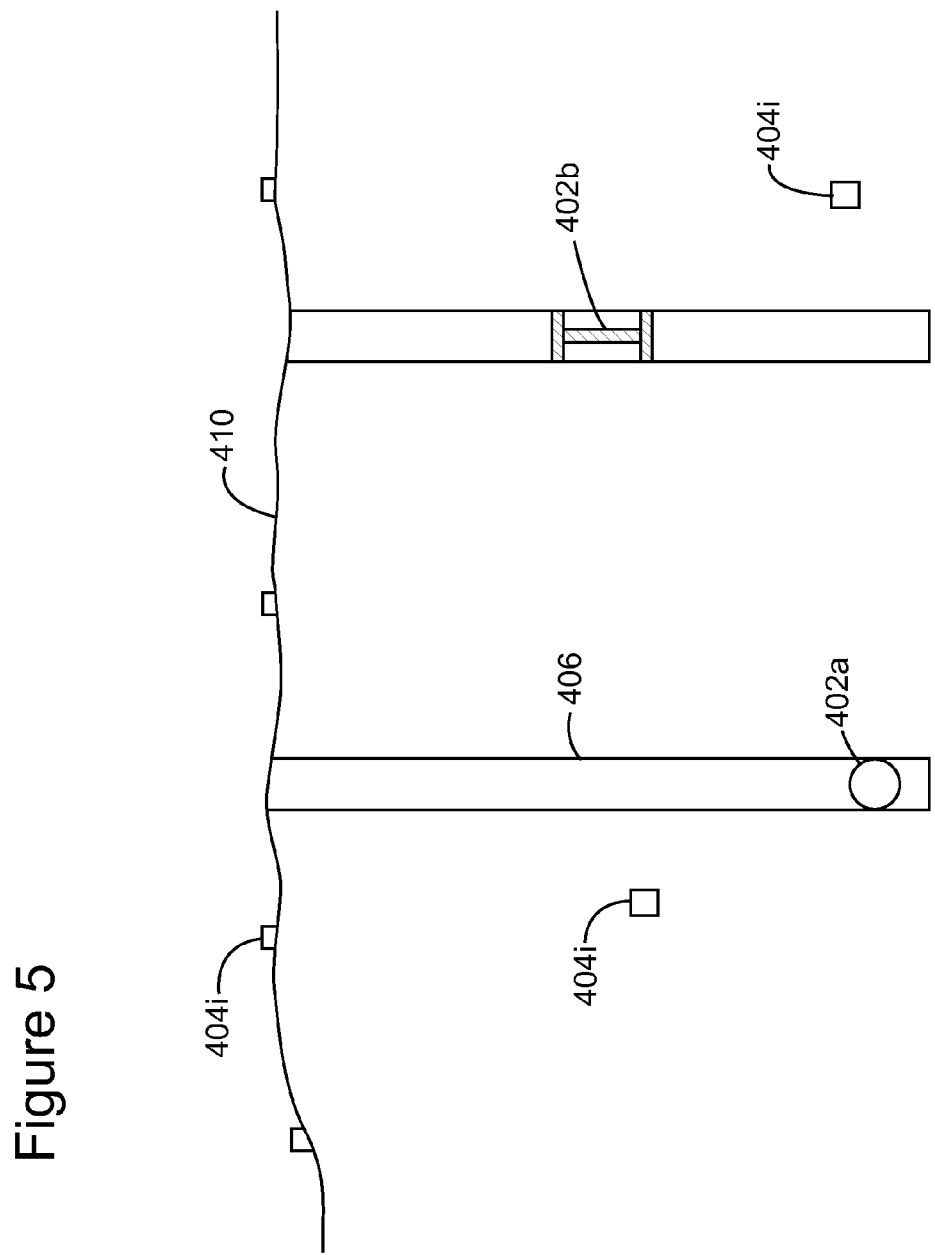

VOLUMETRIC AND NON-VOLUMETRIC SOURCES-BASED SEISMIC SURVEY AND METHOD

BACKGROUND

1. Technical Field

Embodiments of the subject matter disclosed herein generally relate to devices and methods for generating seismic waves underground and, more particularly, to mechanisms and techniques for generating seismic waves with volumetric and non-volumetric seismic sources.

2. Discussion of the Background

Land seismic sources may be used to generate seismic waves in underground formations for investigating geological structures. A seismic source may be located on the ground or it may be buried in the ground. The seismic source, when activated, imparts energy into the ground. Part of that energy travels downward and interacts with the various underground layers. At each interface between these layers, part of the energy is reflected and part of the energy is transmitted to deeper layers. The reflected energy travels toward the surface of the earth, where it is recorded by seismic sensors. Based on the recorded seismic data (traces), images of the underground layers may be generated. Those skilled in the art of seismic image interpretation are then able to estimate whether oil and/or gas reservoirs are present underground. A seismic survey investigating underground structures may be performed on land or water.

Current land seismic sources generate a mixture of P-waves and S-waves. A P-wave (or primary wave or longitudinal wave) is a wave that propagates through the medium using a compression mechanism, i.e., a particle of the medium moves parallel to a propagation direction of the wave and transmits its movement to a next particle of the medium. This mechanism is capable of transmitting energy both in a solid medium (e.g., earth) and in a fluid medium (e.g., water). An S-wave, different from a P-wave, propagates through the medium using a shearing mechanism, i.e., a particle of the medium moves perpendicular to the propagation direction of the wave and shears the medium. This particle makes the neighboring particle also move perpendicular to the wave's propagation direction. This mechanism is incapable of transmitting energy in a fluid medium, such as water, because there is not a strong bond between neighboring water particles. Thus, S-waves propagate only in a solid medium, i.e., earth.

The two kinds of waves propagate with different speeds, with P-waves being faster than S-waves. They may carry different information regarding the subsurface and, thus, both are useful for generating a subsurface image. However, when both of them are recorded with the same receiver, the strong S-wave content may obscure the P-wave content in certain portions, rendering the final image inaccurate.

Thus, there is a need to record both types of waves, with the ability to separate, at the emission stage, the two kinds of waves as needed. However, current use of land seismic sources does not offer this possibility. Currently, P- and S-waves generated by a land seismic source are simultaneously recorded by plural receivers, and during the processing stage, various strategies are employed for separating the two. However, this process may be time-intensive and inaccurate.

BRIEF SUMMARY OF THE INVENTION

According to an exemplary embodiment, there is a seismic survey system for surveying a subsurface. The system includes a volumetric land source buried underground for generating P-waves; a non-volumetric land source buried underground for generating P- and S-waves; plural receivers distributed about the volumetric and non-volumetric land sources and configured to record seismic signals corresponding to the P- and S-waves; and a controller connected to the volumetric land source and the non-volumetric land source and configured to shot them in a given pattern.

According to another exemplary embodiment, there is a method for combining traces related to a surveyed subsurface for enhancing clarity of the subsurface. The method includes receiving first traces corresponding to a volumetric source; receiving second traces corresponding to a non-volumetric source, wherein the first and second traces correspond to the surveyed subsurface; extracting from the first traces, third traces that correspond to near offset reflections and transmissions and the third traces contain substantially P-waves; replacing with the third traces, in the second traces, fourth traces that correspond to the near offset reflections and transmissions, wherein the fourth traces include both P- and S-waves; and using the obtained combination of second traces and third traces to generate a final image of the subsurface.

According to still another exemplary embodiment, there is a method for conducting a surveying a subsurface. The method includes deploying plural receivers above and/or below land; burying a volumetric source underground; burying a non-volumetric source underground; shooting the volumetric and non-volumetric sources; and combining first traces corresponding to the volumetric source with second traces corresponding to the non-volumetric source to generate a final image of the subsurface.

BRIEF DESCRIPTION OF THE DRAWINGS

For a more complete understanding of the present invention, reference is now made to the following descriptions taken in conjunction with the accompanying drawings, in which:

FIG. 1A is a schematic diagram of a volumetric seismic source;

FIG. 1B is a schematic illustration of the waves produced by a volumetric source;

FIG. 3A is a schematic diagram of a non-volumetric seismic source;

FIG. 3B is a schematic illustration of the waves produced by a non-volumetric source;

FIG. 5 is a schematic diagram of a surveying system using a combination of volumetric and non-volumetric sources buried in different wells according to an embodiment;

DETAILED DESCRIPTION OF THE INVENTION

Figure 2:
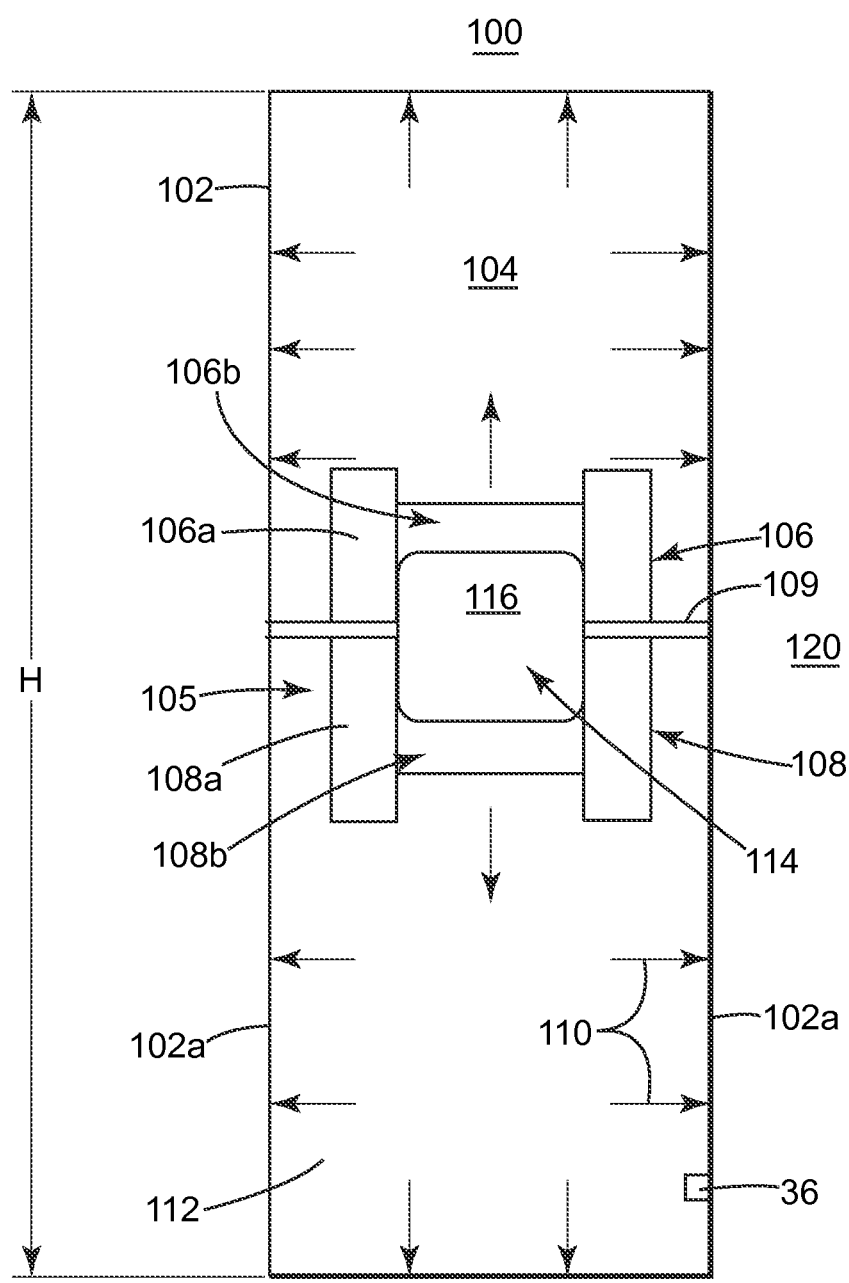
FIG. 2 is a schematic diagram of another volumetric seismic source.

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a land seismic source used to perform a seismic survey to evaluate the structure of a solid formation. However, the embodiments are not limited to this structure, but they may be used for reservoir characterization, e.g., 4-dimensional surveying.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an exemplary embodiment, a combination of a volumetric source and a non-volumetric source is used to perform a seismic survey. The two different land seismic sources may be shot sequentially or simultaneously to generate both P- and S-waves. The reflected waves are recorded by plural receivers. While the non-volumetric source produces strong S-waves for near offset reflections and transmission (i.e., the waves that travel directly from the source to the receivers) and they hide the reflected and transmitted waves for long offsets, the volumetric source produces, essentially, only P-waves, which do not hide the near offset reflections and transmissions. Thus, by recording P-waves generated by the volumetric source and also P- and S-waves generated by the non-volumetric source over a same subsurface, it is now possible to separate the S-waves from the P-waves for near offset reflections and transmissions as discussed next.

Some examples of volumetric sources are now presented. A first volumetric source may be driven in an impulsive mode or in a vibratory mode. For example, FIG. 1A illustrates a seismic source 10 configured to operate in an impulsive mode. The seismic source 10 includes a spherical tank 12 filled with fluid 14 (e.g., mineral oil or water) buried underground 16 and in close contact with the ground. At the surface 18, a pump 20 is used to feed fluid into the tank 12, and valves 22 and 24 are used to control the out-flow and in-flow of the fluid between the tank 12 and the pump 20. The pump 20 may include a power pack and controllers. With these controls, which may be operated remotely via telemetry unit 26 from a central control and recording station 28, it is possible to build up pressure in the tank that will expand its volume and then quickly release it, causing a pressure pulse and generating P-wave seismic energy.

Although the tank 12 is illustrated in FIG. 1A as being spherical, it may have a cylindrical shape. Note that a spherical shape minimizes S-wave production because a spherical shape source 10 is acting like a monopole, i.e., generating only spherical waves 40, as schematically illustrated in FIG. 1B. However, even a cylindrical tank having a length comparable to the cylinder's diameter can be considered a volumetric source. From this point of view, a source is considered to be volumetric when most of the generated energy is carried by P-waves and not S-waves. Thus, although an ideal volumetric source is considered to generate no S-waves, in practice, a volumetric source also generates some S-waves.

Optionally, a clean-out line equipped with valve 30 may be used to drain the fluid from the tank 12. A cement plug 32 may be provided on top of the tank 12 for burying the source, and a seismic sensor 34 (e.g., hydrophone) may be placed in the tank 12 for measuring the seismic waves produced. Also, a pressure transducer 36 may be provided inside the tank 12 for measuring the fluid pressure acting on the walls in contact with the earth. This configuration is best suited when the tank 12 is buried at a shallow depth, because if the inlet and outlet lines are too long, the high frequency output of the system may be compromised due to the fluid inertance imposed by long passageways. The fluid inertance will tend to limit the rate at which pressure can change.

Alternatively, the seismic source may be vibratory as illustrated in FIG. 2. The source 100 has a tank 102 that includes a cavity 104. The same considerations discussed above regarding the shape of the tank 12 apply to tank 102. An actuation mechanism (e.g., piston arrangement) 105 is provided inside the cavity 104 and may include two back-to-back actuators 106 and 108, which may be electromagnetic. The actuation mechanism may be fixed relative to the tank 102 with a support element 109, which may be a bracket. In one application, one or more than two electromagnetic actuators are used. Each actuator may include a coil 106a or 108a configured to electromagnetically displace a corresponding piston 106b or 108b. Alternatively, the piston may be driven by a motor and cam system at a frequency geared to the motor speed.

The piston motion causes an increase and decrease in the pressure 110 of a working fluid 112 inside the tank 102, causing an increase and decrease in pressure on the ground 120. These pressure changes cause a seismic P-wave signal to propagate from the source into the ground. The frequency of the generated P-wave may be controlled by controlling the movement of the pistons 106b and 108b. Note that electromagnetic actuators have a larger displacement than conventional piezoelectric units.

To transform the displacement of the pistons 106b and 108b from a low force into a large force with smaller displacements, as desired for the present volumetric source, a fluid may be used for coupling, as discussed next. The volumetric source 100, as already noted above, is configured to change one or more dimensions and, thus, its volume when actuated. However, because the tank 102 is made of steel or other similar material, the source 100 cannot accommodate overly large dimensional changes. Thus, it is desirable that displacement of the pistons with low force be transformed into a small displacement with high force to act on the walls 102a of the tank 102.

According to the exemplary embodiment illustrated in FIG. 2, the piston arrangement 105 is immersed in the working fluid 112 so that the working fluid 112 couples the pistons 106b and 108b to the walls 102a of the tank 102. At the same time, the working fluid also cools the coils 106a and 108a. The back sides of the pistons 106b and 108b form an inner cavity 114. This inner cavity 114 may be configured to trap another fluid 116 (e.g., air). Thus, the back sides of the pistons 106b and 108b work against the fluid 116. In this case, the fluid 116 works to counteract the hydrostatic pressure in the first fluid 112. In other words, the fluid 116 works as a spring. Other volumetric sources exist but are not discussed herein.

An example of a non-volumetric source is discussed next. FIG. 3A illustrates a non-volumetric source 300 (a similar source is described, for example, in U.S. Pat. No. 7,420,879 to Meynier et al., the entire content of which is incorporated herein by reference) that includes plural vibrators (electromechanical, electromagnetic, hydraulic, piezoelectric, magnetostrictive, etc.) forming a pillar 301 in contact with plates 302 and 303. A force is applied to the pillar 301 to displace the plates 302 and 303, thereby generating a seismic wave. Because the ground around the source is displaced unsymmetrically, strong S-waves are generated. FIG. 3B schematically illustrates lobes 320 representing the S-waves and waves 330 representing the P-waves. Note that a volume of the source does not necessarily increase when the plates 302 and 303 move apart, contrary to a volumetric source, because the ground between these two plates may move toward the pillar 301.

Pillar 301, which may be covered with a deformable membrane 304, is connected by a cable 305 to a signal generator 306. Source 300 is placed in a cavity or well W, for example, of 5 to 30 cm in diameter, at a desired depth under the weather zone layer WZ, for example, between 5 and 1000 m. A coupling material 307, such as cement or concrete, is injected into the well to be in direct contact with pillar 301 over the total length thereof and with plates 302 and 303. To allow the coupling material 307 to be homogeneously distributed in the space between plates 302 and 303, the plates may have perforations 308. The diameter of plates 302 and 303 substantially corresponds to the diameter of the cavity or well W so as to achieve maximum coupling surface area.

The signal generator 306 generates an excitation signal in a frequency sweep or a single frequency, causing elements forming the pillar 301 to expand or contract temporarily along the pillar's longitudinal axis. Metal plates 302 and 303 are mounted on the pillar ends to improve the coupling of pillar 301 with coupling material 307. Coupling material 307 intermediates the coupling between the source and the formation. For example, plates 302 and 303 have a thickness of 10 cm and a diameter of 10 cm. Pillar 301 may have a length exceeding 80 cm. The membrane 304 may be made of polyurethane and surround pillar 301 to decouple it from the coupling material (cement) 307. Thus, only the end portions of pillar 301 and plates 302 and 303 are coupled with the coupling material (cement) 307. Upon receiving an excitation (electrical signal) from the signal generator 306, source 300 generates forces along the pillar's longitudinal axis. This conventional source provides good repeatability and high reliability, once a good coupling is accomplished.

A typical pillar has a cylindrical shape with a radius of 5 cm and a length of 95 cm. This pillar may consist of 120 ceramics made, for example, of lead-zirconate-titanate (PZT) known under the commercial name NAVY type I. Each ceramic may have a ring shape with 20 mm internal diameter, 40 mm external diameter and 4 mm thickness. The maximum length expansion obtainable for this pillar in the absence of constraints is 120 µm, corresponding to a volume change of about 1000 mm$^3$. The electrical signals fed to the pillars have 5-300 Hz, 2500 V peak maximum and 2 A peak maximum. The numbers presented above are exemplary and those skilled in the art would recognize that various sources have different characteristics. Other non-volumetric sources exist but are not presented herein.

Figure 4A:
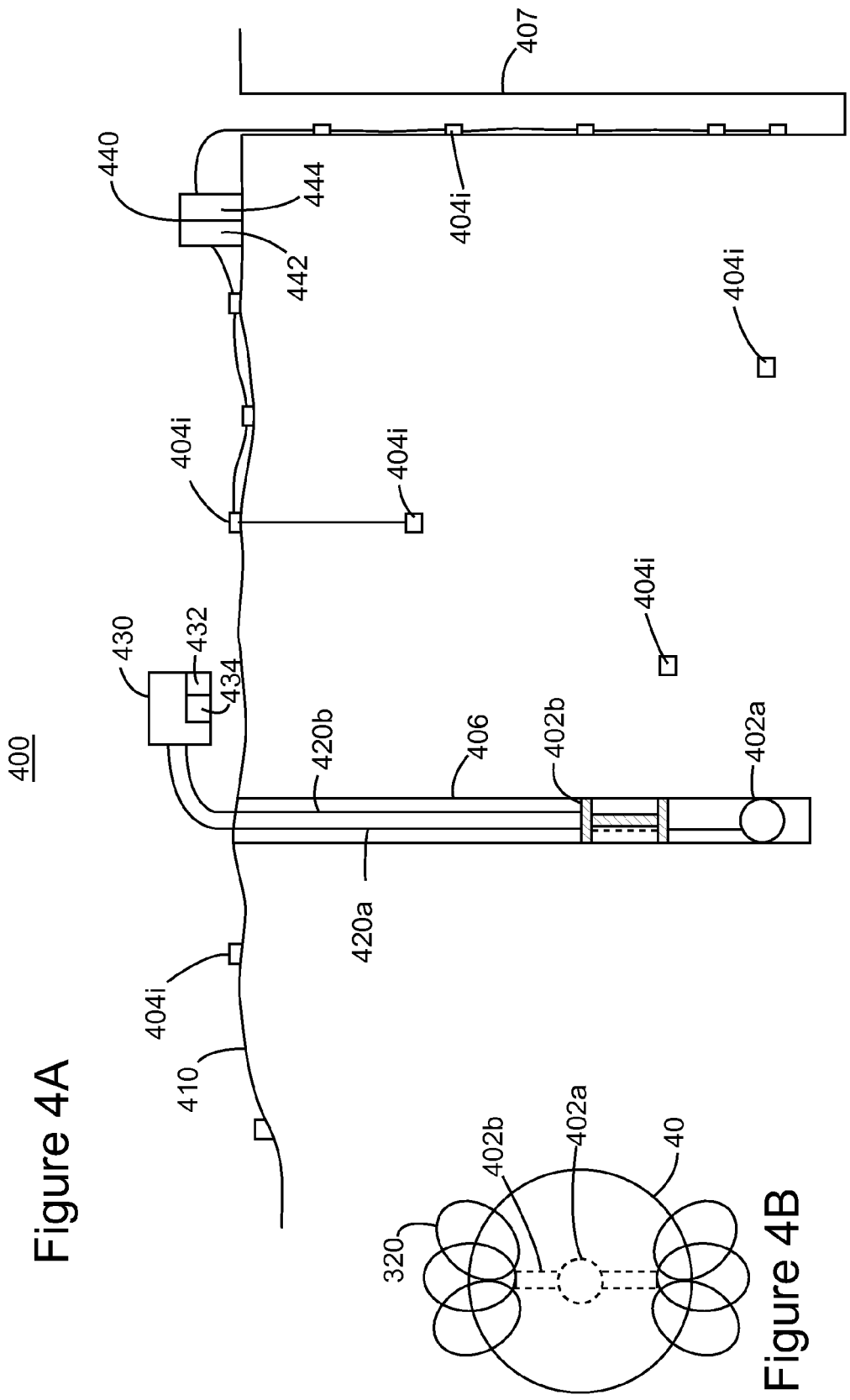
FIG. 4A is a schematic diagram of a surveying system using a combination of volumetric and non-volumetric sources according to an embodiment.
Figure 4B:
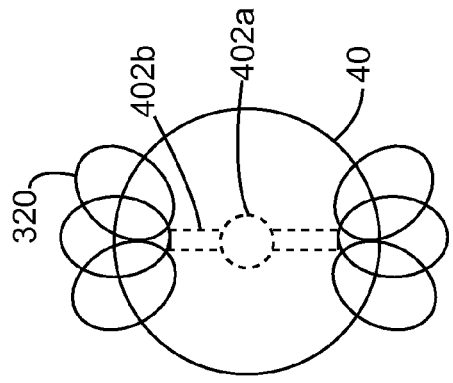
FIG. 4B is a schematic illustration of the waves produced by a combined volumetric and non-volumetric source according to an embodiment.

However, the novel embodiments discussed next apply to any kind of volumetric and non-volumetric sources. According to an exemplary embodiment illustrated in FIG. 4A, a land seismic surveying system 400 includes sources 402a-b and receivers 404i. Sources 402a-b may be located inside a well 406, underground. Source 402a may be volumetric and source 402b may be non-volumetric, as discussed above. In another embodiment, the non-volumetric source is at a greater depth than the volumetric source, i.e., opposite what is shown in FIG. 4A. This arrangement has the advantage that a single well accommodates both sources. FIG. 4B schematically illustrates the P- and S-waves generated by a combination of volumetric and non-volumetric sources 402a-b.

Figure 6:
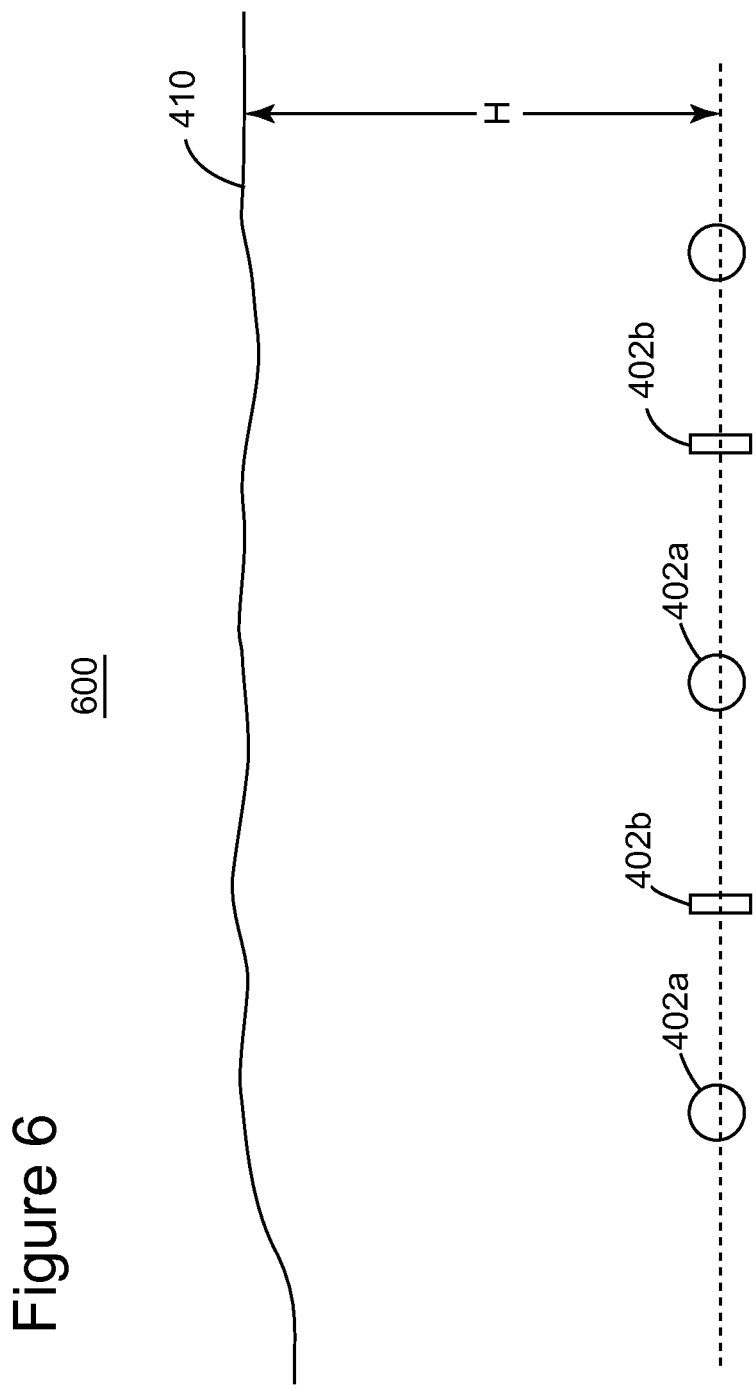
FIG. 6 is a schematic diagram of a surveying system using a combination of volumetric and non-volumetric sources buried at a same depth according to an embodiment.
Figure 7:
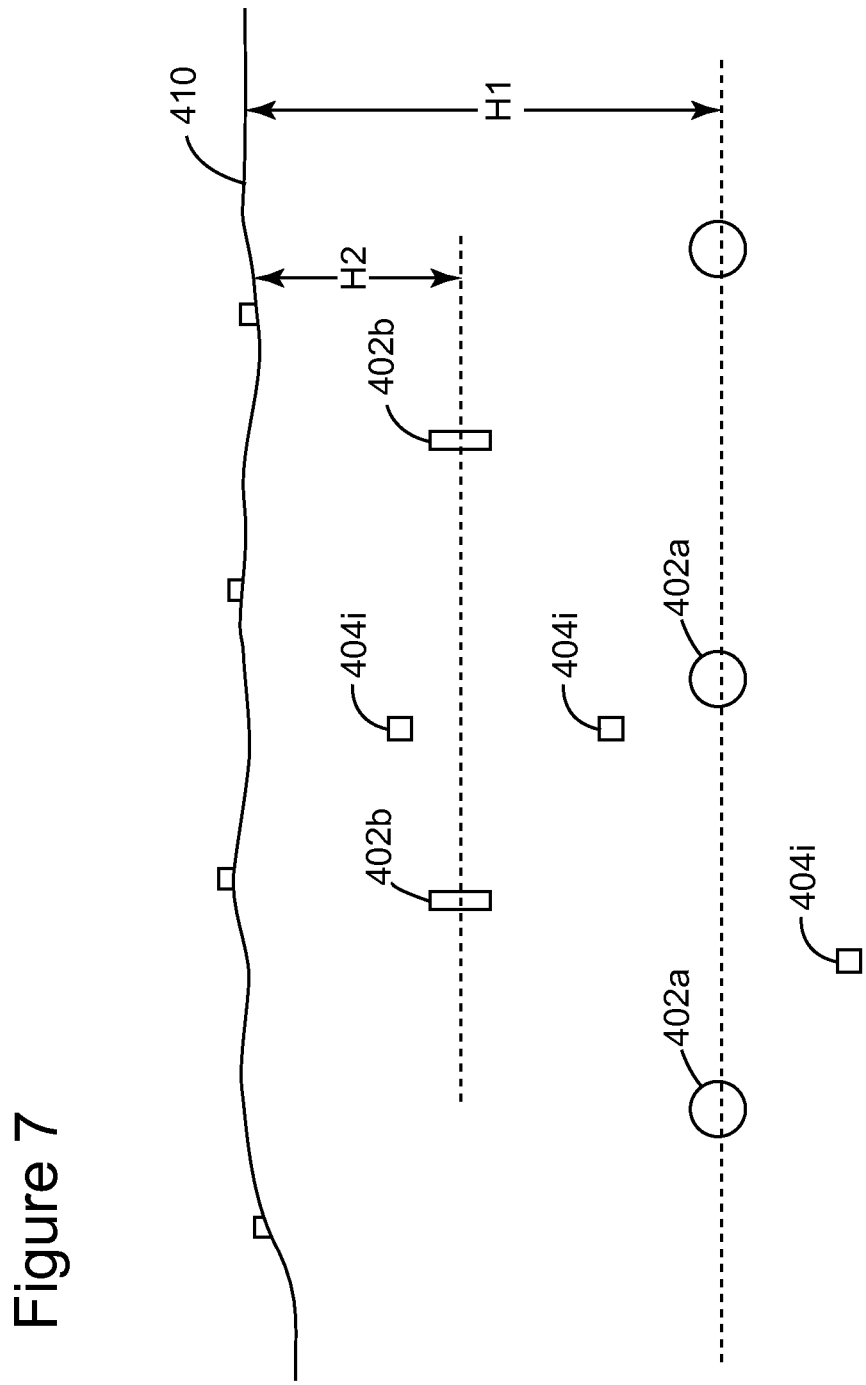
FIG. 7 is a schematic diagram of a surveying system using a combination of volumetric and non-volumetric sources buried at different levels according to an embodiment.

However, as illustrated in FIG. 5, multiple wells may be dug to accommodate individual sources 402a-b. Receivers 404i are distributed at the surface 410 and/or below the surface. In one exemplary embodiment, the receivers are buried in the ground as discussed with regard to FIG. 4A. Also, the depths of the various sources may change with the survey. In one application, all the sources are buried at the same depth H as illustrated in FIG. 6. In another exemplary embodiment, the volumetric sources 402a are located at a first depth H1, and the non-volumetric sources 402b are located at a second depth H2, different from H1. FIG. 7 illustrates the case when H1 is greater than H2. Note that the sources may be located in a well as shown in FIG. 4A or completely buried underground.

Returning to FIG. 4A, each source is linked to a corresponding cable 420a and 420b that connects the sources to one or more controllers 430, a controller including a processor 432 and a storage device 434. The processor 432 may be programmed to shoot the sources simultaneously, sequentially, using the slip-sweep technique, or any other known technique. Receivers 404i may be distributed according to various configurations. For example, the receivers may be located above or below the ground. If below ground, they may be located vertically above the sources, between the volumetric and non-volumetric sources, below the sources or based on a combination of these arrangements. In one application, receivers 404i are distributed in another well 407. The depth distribution of the receivers inside this additional well may be similar to that used when the receivers are not placed in the well. Receivers 404i may be linked to a controller 440 that includes a processor 442 and a storage device 444. When in use, the receivers may send the seismic data, through a wireless or wired interface, to the storage device 444 and the processor 442 may be configured to process the data as discussed later. The controller may be located in the field or at a remote location, for example, in a processing center.

Figure 8:
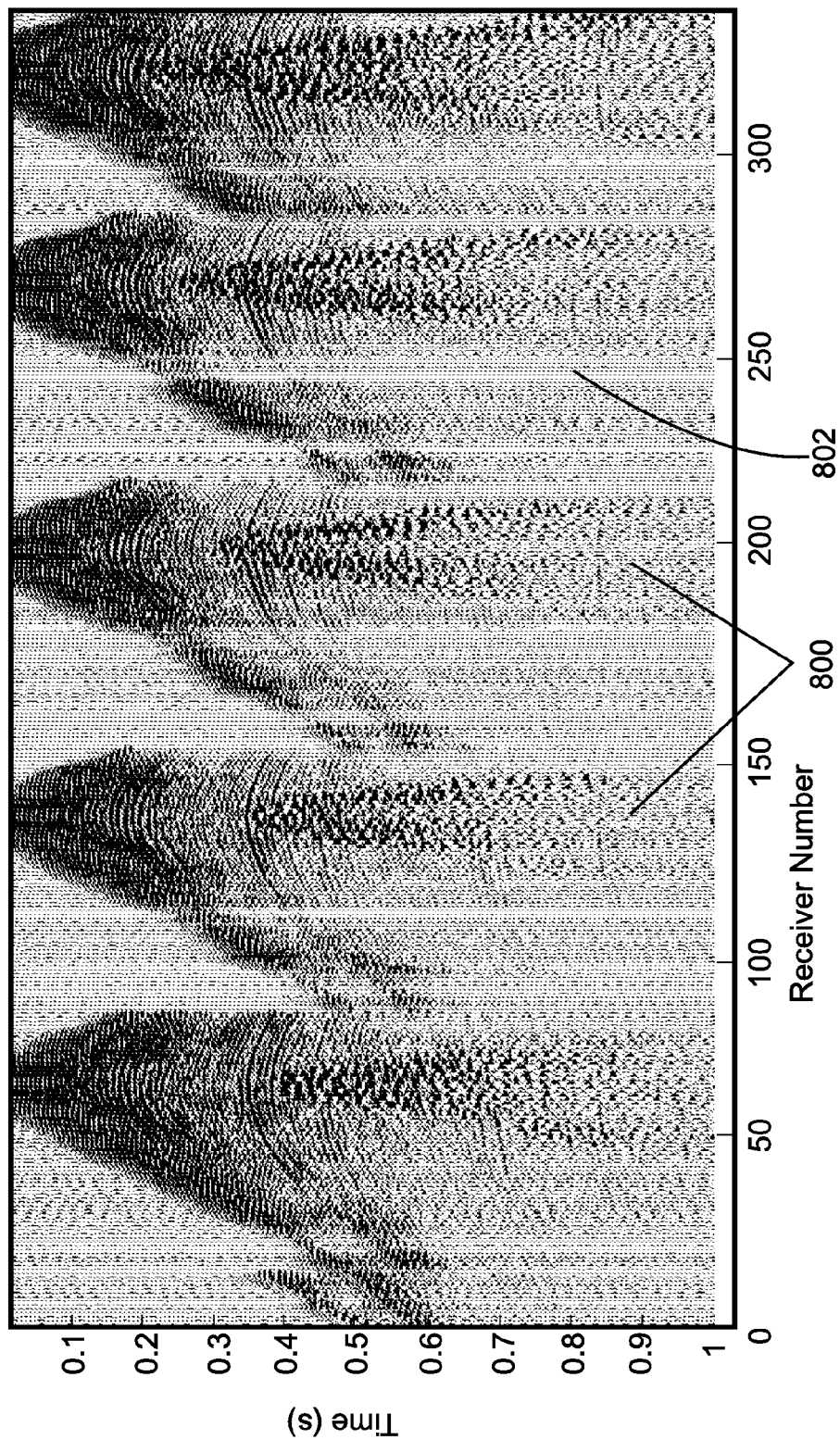
FIG. 8 is a graphic illustrating recorded traces generated by a volumetric source according to an embodiment.

With this mixed arrangement of land seismic sources, an actual seismic survey has been performed and the following results have been obtained. FIG. 8 illustrates traces recorded by the plural receivers using only volumetric sources 402a. The number of receivers is represented on the X axis, and the time in seconds is represented on the Y axis. Note that good signals are obtained for the near offset reflections and transmissions 800, but not-so-good signals are obtained for the far offset reflections and transmissions 802. A near offset reflection means a reflected signal recorded by a receiver that is close (near) to the source while a far offset reflection is a trace recorded by a receiver that is far from the source. A near offset transmission means a signal that is transmitted directly from the source to a close by receiver while a far offset transmission is a signal that is transmitted directly from the source to a faraway receiver.

Figure 9:
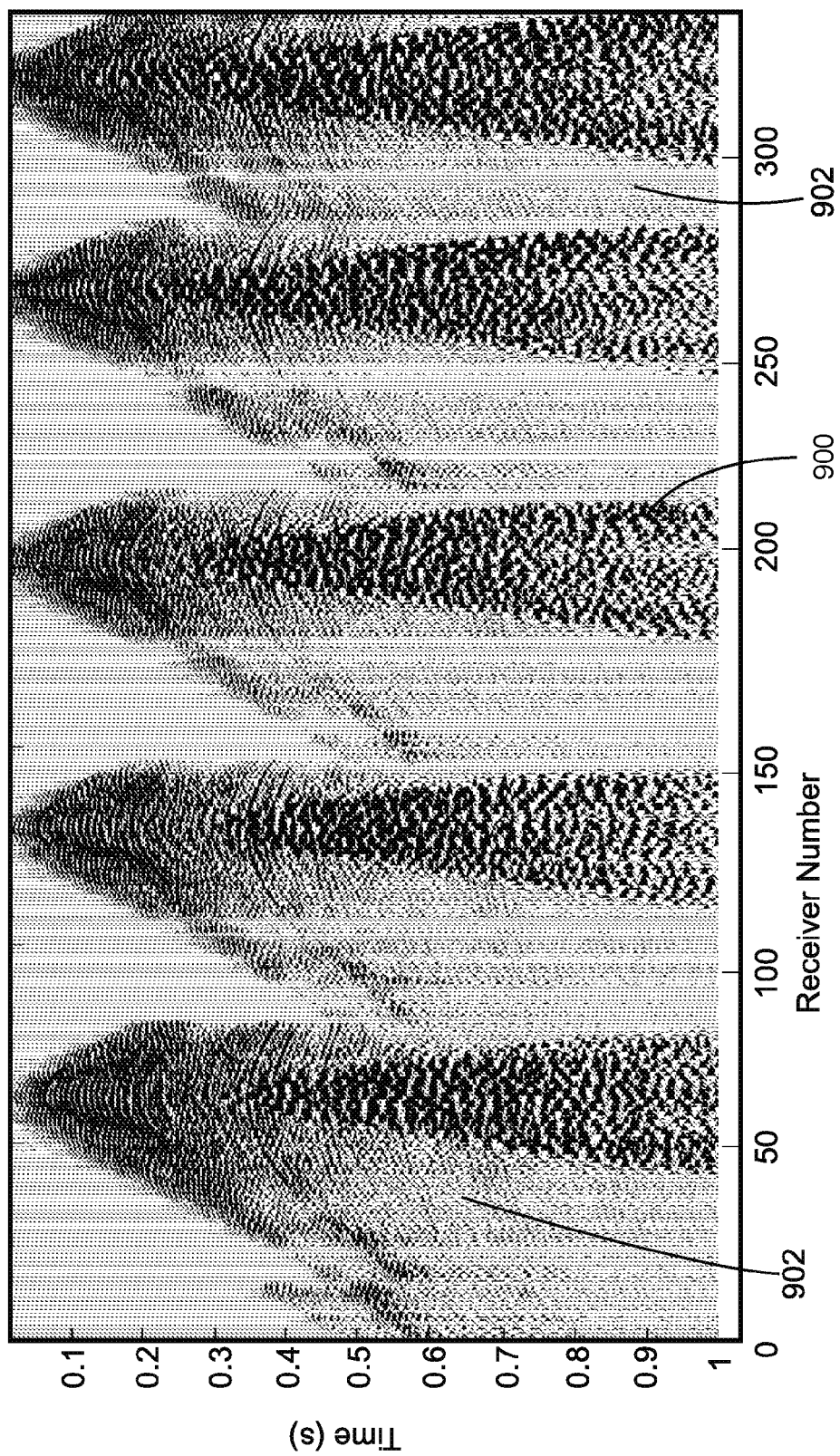
FIG. 9 is a graphic illustrating recorded traces generated by a non-volumetric source according to an embodiment.

FIG. 9 illustrates traces recorded with the plural receivers when non-volumetric sources are used. Note that the traces 900 corresponding to the near offset reflections and transmissions are very difficult to separate and process because of the strong S-waves, while the traces 902 corresponding to the far offset reflections and transmissions have better quality than the corresponding traces 802. The traces shown in FIGS. 8 and 9 may be obtained by sequentially shooting volumetric sources and non-volumetric sources. Alternatively, the volumetric and non-volumetric sources may be shot simultaneously in time, but with different frequencies, e.g., using sinusoids to drive the sources. In another embodiment, the sources may be fired simultaneously based on orthogonal signals.

Thus, according to an exemplary embodiment, traces 800 corresponding to the near offset reflections and transmissions may be extracted from the recordings corresponding to the volumetric source (P-waves) and then subtracted from traces 900 corresponding to the near offset reflections and transmissions corresponding to the non-volumetric source (P- and S-waves). In this way, for the near offset reflections and transmissions (not for the far offset reflections and transmissions), the traces corresponding to the S-waves may be separated. These traces can then be subtracted from traces 900 shown in FIG. 9 to remove the S-waves contribution for the near offset reflections and transmissions, but not for the far offset reflections and transmissions.

Figure 10C:
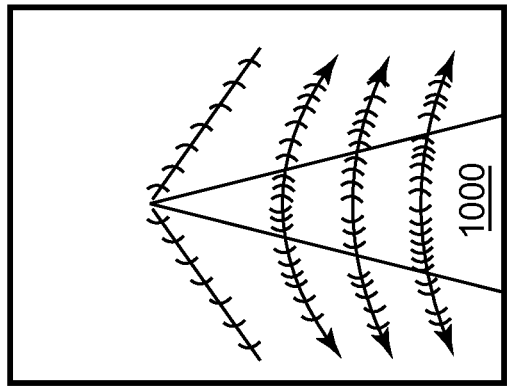
FIGS. 10A-C schematically illustrate how the traces from volumetric and non-volumetric sources are to be combined according to an embodiment.
Figure 10B:
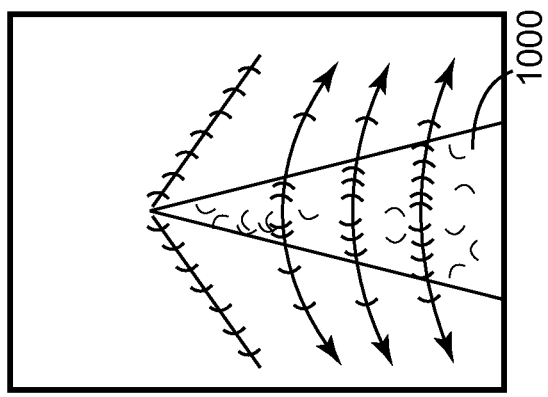
Figure 10A:
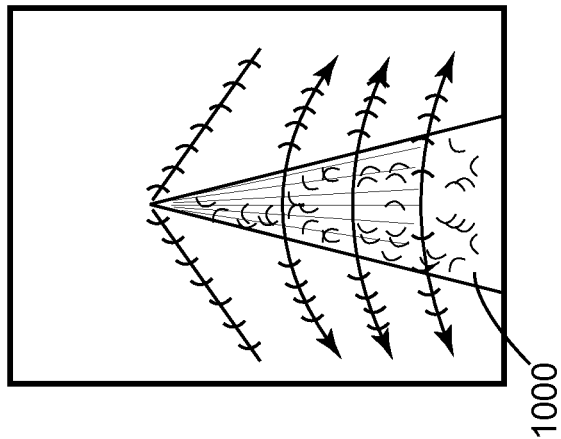

In other words, as schematically illustrated in FIG. 10A, traces recorded with non-volumetric source have good quality (many wiggle lines) for the far offset reflections and transmissions (outside triangle 1000) and low quality (few wiggle lines) for the near offset reflections and transmissions (inside the triangle 1000). The traces recorded with the volumetric source, as illustrated in FIG. 10B, have poor quality for the far offset reflections and transmissions (outside triangle 1000) and good quality for the near offset reflections and transmissions (inside the triangle 1000). Thus, the volumetric data inside the triangle 1000 in FIG. 10B is used to substitute the non-volumetric data inside the triangle 1000 in FIG. 10A and, thus, as illustrated in FIG. 100, good quality traces are obtained for both the near offset reflections and transmissions (from the volumetric source) and the far offset reflections and transmissions (from the non-volumetric source). Note that far offset reflections and transmissions from both volumetric and non-volumetric data may be added together to enhance this portion of data as illustrated in FIG. 100.

Figure 11:
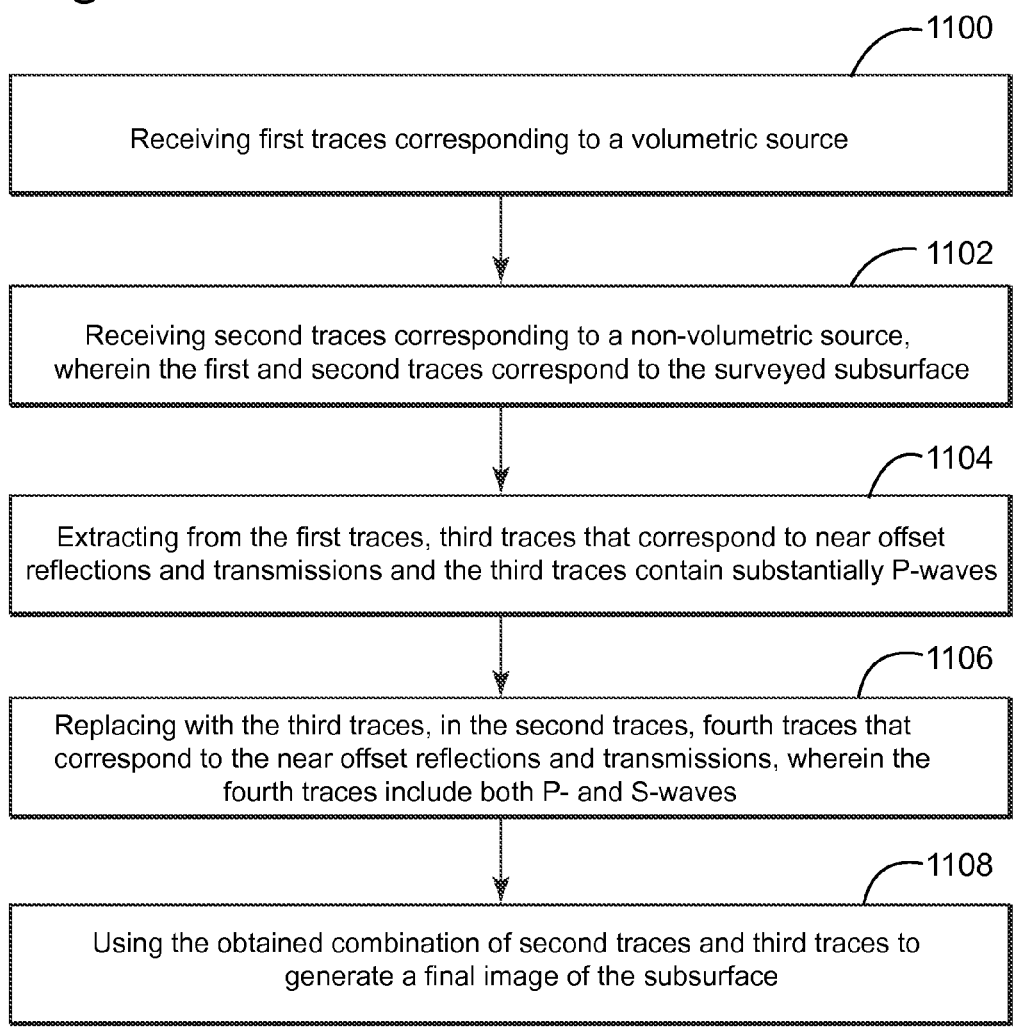
FIG. 11 is a flowchart of a method for processing traces from volumetric and non-volumetric sources according to an embodiment.

Thus, as illustrated in FIG. 11, a method for combining traces related to a surveyed subsurface for enhancing clarity of the subsurface includes a step 1100 of receiving first traces corresponding to a volumetric source; a step 1102 of receiving second traces corresponding to a non-volumetric source, wherein the first and second traces correspond to the surveyed subsurface; a step 1104 of extracting from the first traces, third traces that correspond to near offset reflections and transmissions and the third traces contain substantially P-waves; a step 1106 of replacing with the third traces, in the second traces, fourth traces that correspond to the near offset reflections and transmissions, wherein the fourth traces include both P- and S-waves; and a step 1108 of using the obtained combination of second traces and third traces to generate a final image of the subsurface.

Figure 12:
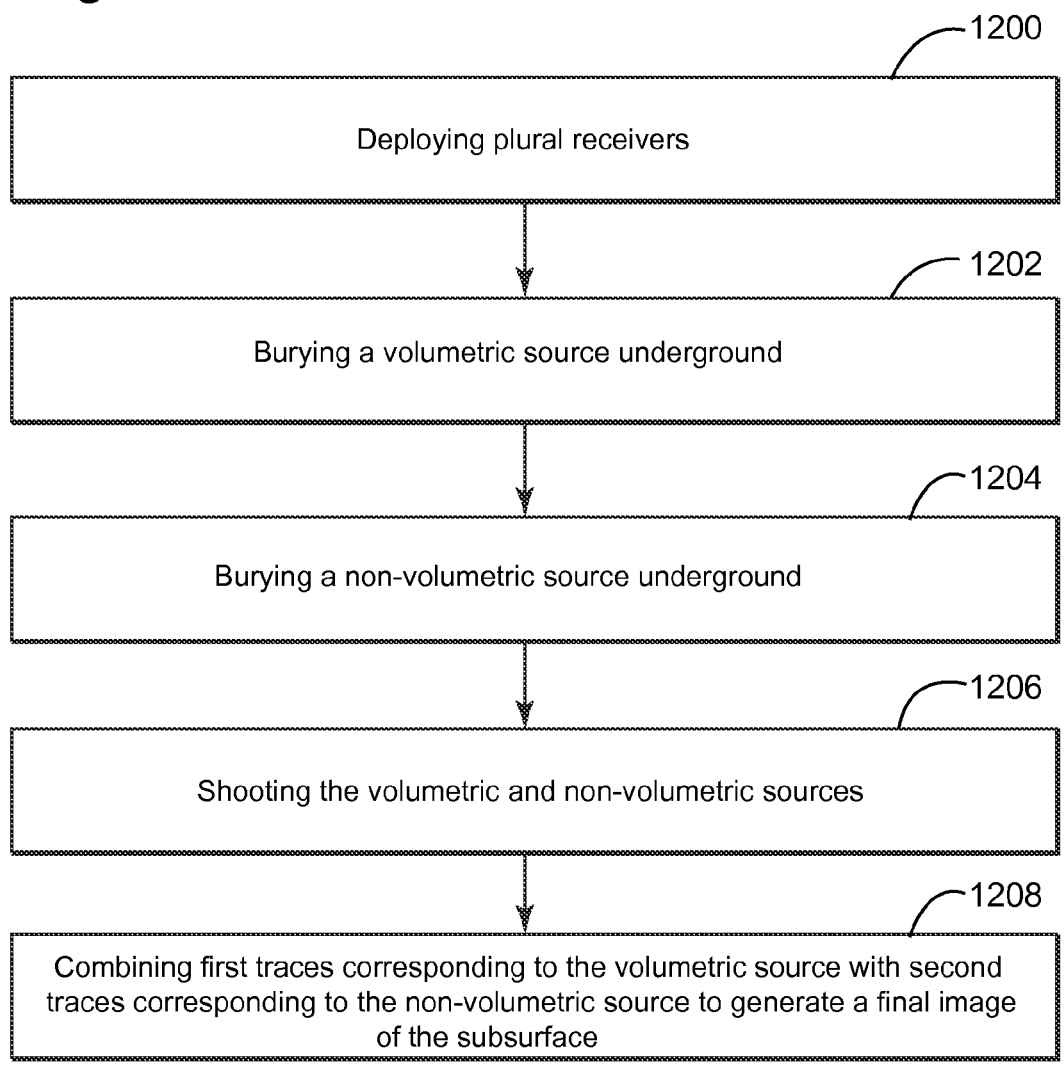
FIG. 12 if a flowchart of a method for performing a land seismic survey using simultaneously or sequentially volumetric and non-volumetric seismic sources according to an embodiment.

According to another exemplary embodiment illustrated in FIG. 12, there is a method for conducting a surveying a subsurface. The method includes a step 1200 of deploying plural receivers; a step 1202 of burying a volumetric source underground; a step 1204 of burying a non-volumetric source underground; a step 1206 of shooting the volumetric and non-volumetric sources; and a step 1208 of combining first traces corresponding to the volumetric source with second traces corresponding to the non-volumetric source to generate a final image of the subsurface. The step 1208 may include a step 1210 of extracting first traces corresponding to the volumetric source; a step 1212 of extracting second traces corresponding to the non-volumetric source, wherein the first and second traces correspond to the surveyed subsurface; a step 1214 of extracting from the first traces, third traces that correspond to near offset reflections and transmissions and the third traces contain substantially P-waves; and a step 1216 of replacing with the third traces, in the second traces, fourth traces that correspond to the near offset reflections and transmissions, wherein the fourth traces include both P- and S-waves.

The disclosed exemplary embodiments provide volumetric and non-volumetric seismic sources and related methods for generating seismic waves in a formation. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A seismic survey system for surveying a subsurface, the system comprising:
    a volumetric land source buried underground for generating P-waves;
    a non-volumetric land source buried underground for generating P- and S-waves;
    plural receivers distributed about the volumetric and non-volumetric land sources and configured to record seismic signals corresponding to the P- and S-waves; and
    a controller connected to the volumetric land source and the non-volumetric land source and configured to shoot them in a given pattern, wherein the plural receivers are arranged so that first receivers among the plural receivers to have a near offset relative to the volumetric land source and/or the non-volumetric land source, and second receivers among the plural receivers to have a far offset relative to the volumetric land source and/or the non-volumetric land source.

2. The system of claim 1, wherein the volumetric land source is spherical.

3. The system of claim 1, wherein the volumetric land source is buried in a well below the non-volumetric land source.

4. The system of claim 1, wherein the volumetric land source includes plural individual volumetric sources placed at first different horizontal-plane positions and the non-volumetric land source includes plural individual non-volumetric sources placed at second different horizontal-plane positions.

5. The system of claim 4, wherein the plural individual volumetric sources are buried a first depth H1 and the plural individual non-volumetric sources are buried at a second depth H2.

6. The system of claim 5, wherein the first depth H1 is larger than the second depth H2.

7. The system of claim 5, wherein the first depth H1 is smaller than the second depth H2.

8. The system of claim 5, wherein the first depth H1 is equal to the second depth H2.

9. The system of claim 1, wherein the given pattern includes shooting the volumetric and the non-volumetric sources sequentially or simultaneously.

10. The system of claim 9, further comprising:
a memory device for storing traces recorded by the plural receivers; and
a processor connected to the memory device and configured to combine first traces corresponding to the volumetric source with second traces corresponding to the non-volumetric source.

11. The system of claim 10, wherein the processor is further configured to:
separate the first traces corresponding to the volumetric source from the second traces corresponding to the non-volumetric source;
extracting from the first traces third traces that correspond to the near offset reflections and transmissions and contain substantially P-waves;
replacing with the third traces, in the second traces, fourth traces that correspond to the near offset reflections and transmissions; and
using the obtained combination of second traces and third traces to generate a final image of the subsurface.

* * * * *